United States Patent [19]

D'Silva

[11] 4,149,881

[45] Apr. 17, 1979

[54] NICKEL PALLADIUM BASE BRAZING ALLOY

[75] Inventor: Thomas L. D'Silva, Belmont, Calif.

[73] Assignee: Western Gold and Platinum Company, Belmont, Calif.

[21] Appl. No.: 920,096

[22] Filed: Jun. 28, 1978

[51] Int. Cl.² .................. C22C 19/05; C22C 30/00
[52] U.S. Cl. ........................... 75/134 F; 75/134 N; 75/171; 75/172 R
[58] Field of Search ............ 75/134 N, 134 F, 134 P, 75/171, 172 R, 128 F

[56] References Cited

U.S. PATENT DOCUMENTS

| | | | |
|---|---|---|---|
| 3,070,875 | 1/1963 | Feduska | 29/192 |
| 3,497,332 | 2/1970 | Donnelly et al. | 29/195 |
| 4,061,495 | 12/1977 | Selman et al. | 75/134 F |

FOREIGN PATENT DOCUMENTS 183335  4/1963  Sweden .................. 75/172 R

Primary Examiner—L. Dewayne Rutledge, III
Assistant Examiner—Upendra Roy
Attorney, Agent, or Firm—Donald R. Castle

[57] ABSTRACT

A brazing alloy composition consisting essentially of from about 17 to about 44 percent by weight of palladium, from about 4 to 11 percent by weight of chromium, from about 1 to about 4 percent by weight of silicon from about 1.5 to about 4 percent by weight of boron and the balance nickel is suitable for brazing in the temperature range of from about 1750° F. to about 1850° F. with a recommended brazing temperature of about 1800° F. The brazing temperature of the brazing alloy of this invention is lower than the brazing temperatures of conventional Ni-base phosphorus-free brazing alloys and has good stress-rupture characteristics and oxidation resistance up to 1400° F.

6 Claims, 1 Drawing Figure

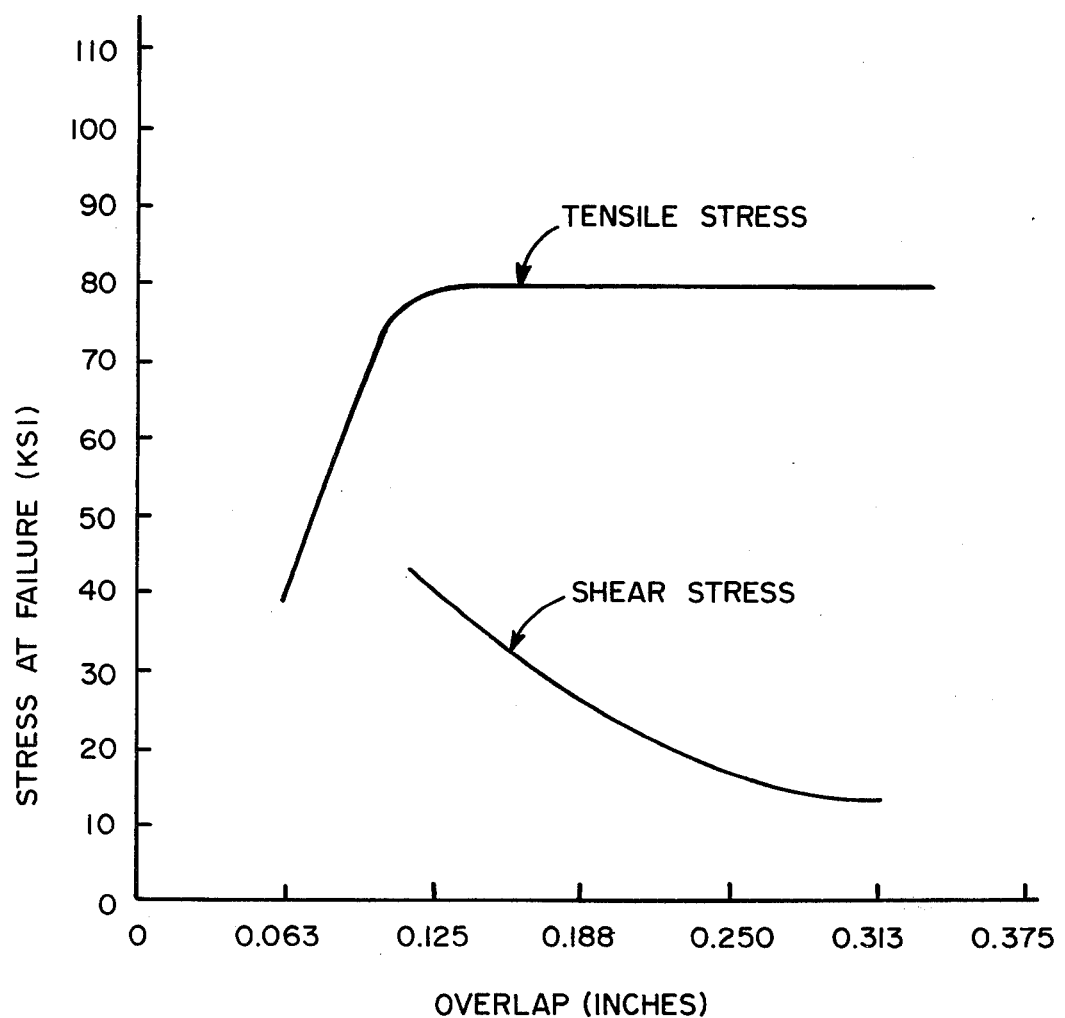

NICKEL PALLADIUM BASE BRAZING ALLOY

BACKGROUND

Some of the superalloys and steels used in the fabrication of components of aircraft engines have to be brazed in the temperature range of from about 1750° F. to about 1850° F. to achieve optimum high temperature mechanical properties. The brazing alloys in the 1750° F. to 1850° F. brazing temperature range currently used are 82Au-18Ni, 41 Au-1.75Si-1.0B, 0–5 Fe balance Ni and 20.5Au-3.4Si-5.3Cr-2.3B-2 Fe-Bal. Ni. The significant Au content of these alloys tends to make these alloys prohibitively expensive. Additionally, the 82Au-18Ni alloy has poor stress rupture properties at high operating temperatures (1400° F.). The lower limit of the brazing temperature for the 41 percent Au brazing alloy is about 1850° F. whereas the lower limit of brazing temperature of the 20.5Au containing alloy is about 1800° F. The other brazing alloys available for brazing in the 1750° F. to 1850° F. brazing temperature range are the phosphorus containing Ni-base brazing alloys. However, phosphorus containing brazing alloys result in brittle brazed joints with depths of penetration into the base alloy, far greater than that required for anchoring the brazing alloy to the substrate.

A brazing alloy that is relatively inexpensive, has the same brazing temperature as the 82Au-18Ni alloy and better stress rupture characteristics is believed to be an advancement in the art.

SUMMARY OF THE INVENTION

In accordance with one aspect of this invention there is provided a brazing alloy in the form of powder, sheet wire or other convenient shapes and consisting essentially of from about 17 to about 44 percent by weight of palladium, from about 4 to about 11 percent by weight of chromium, from about 1 to about 4 percent by weight of silicon, about 1.5 to about 4 percent of boron and balance nickel. For a better understanding of the present invention, together with other objects, advantages and capabilities thereof, reference is made to the following disclosure and appended claims and the drawing in connection with the above description of some of the aspects of the invention.

BRIEF DESCRIPTION OF THE DRAWING

The FIGURE shows the relationship between stresses and the degree of overlap at a brazed joint utilizing the alloys of this invention to braze a nickel base superalloy.

DETAILED DESCRIPTION OF THE PREFERRED EMBODIMENTS

In the alloy compositions of this invention, palladium in the range of from about 17 percent by weight to about 44 percent by weight is added as a temperature depressant to the nickel-chromium-silicon-boron system with a minimum melting point achieved at a nickel-palladium ratio near the minimum melting composition of the palladium-nickel binary system. Additions of palladium also increases the wettability of the Ni-Cr-Si-B brazing alloy system. Chromium is added to the system in the range of from about 4 percent by weight to about 11 percent by weight to give oxidation resistance. The melting point of the system increases when the chromium content is above about 11 percent by weight.

Silicon and boron also act as temperature depressants and provide a self-deoxidizing action during brazing. Silicon is added in the range of from about 1 percent by weight to about 4 percent by weight and is required for depressing the melting point further than that provided by boron itself. The boron addition is from about 1.5 percent by weight to about 4 percent by weight. In this range of boron the melting point is constant but increases above and below this range. Up to about 4 weight percent iron can be added to reduce the solidus-liquidus span. In such iron containing alloys the amount of nickel is reduced by an amount corresponding to the iron content.

Preferred alloy compositions contain from about 28 to about 40 percent by weight of palladium. An especially preferred alloy composition of this invention consists essentially of about 36 percent by weight of palladium, about 11 percent by weight of chromium, about 2.2 percent by weight of silicon, about 2.1 percent by weight of boron and about 58.7 percent by weight of nickel.

The solidus and liquidus temperatures of the composition 36Pd-11Cr-2.2Si-2.1B-Bal. Ni as determined from DTA curves are 1530° F. and about 1735° F. respectively. The minimum temperature at which satisfactory brazing is achieved for this alloy is about 1750° F. The wide melting range for the alloy of this invention is desirable for brazing components with wide gaps and large mismatch.

The alloys of this invention can be produced in a variety of forms. If powders are desired numerous techniques can be employed. Gas atomization is one satisfactory technique wherein a molten stream of the alloy is fed into the throat of a nozzle and a gas at a relatively high pressure (150 to 300 pounds per square inch) hits the molten stream. The metal stream is broken up and solidifies as fine particles. Other techniques include the spinning disk wherein a molten stream is dropped onto a spinning disk and the centrifugal force causes particles of molten metal to be projected from the disk. The particles are cooled and solidified by a gaseous or liquid medium.

If desired, the alloy can be produced in the form of a quickly cooled sheet by directing a stream of molten metal onto the external surface of a rotating chill wheel. Depending upon the rapidity of cooling, an amorphous phase can be formed. Amorphous phase material and microcrystalline materials are more ductile than crystalline materials that are produced by slower cooling. Brazing sheets or foils are preferred over powders or pastes for some applications.

To more fully illustrate the subject invention the following detailed examples are presented. All percentages, proportions and parts are by weight unless otherwise indicated.

EXAMPLE

The base metal selected for testing the brazing alloy of this invention is a nickel base superalloy of nominal composition of 18.6Cr-3.0Mo-5.0Cb-0.5Al-1.0Ti-18.5Fe, the balance being essentially nickel. This superalloy has to be solution treated in the temperature range from about 1700° F. to about 1850° F. to provide the best rupture life and highest fatigue strength.

The composition, 36.0Pd-11.0Cr-2.2Si-2.1B-Bal. Ni is atomized into powder and screened through a 150 mesh screen. The screened powder is made into a paste (84 weight percent brazing alloy) and this paste is used to make brazed joints for all subsequent testing.

T-joints of a nickel-base superalloy brazed at about 1750° F. and about 1850° F. for about 60 minutes in vacuum has a joint micro-hardness ranging from 260 to 290 DPH, as compared to an as cast hardness of 430 DPH for the brazing alloy. Cross-sections of the T-joints brazed at about 1750° F. and about 1850° F. are polished and etched and the depth of penetration of boron and silicon into the base metal is determined to be about 22 and about 34 microns respectively. This depth of penetration of the brazing alloy into the base metal is less than the upper limit of 40 microns which is acceptable from the point of view of anchoring the brazing alloy to the base metal.

Room temperature lap shear specimens ranging in overlap of from 0.0625 inches through 0.375 inches are brazed at 1800° F. for 60 minutes in vacuum. The FIGURE shows the joint shear stress and tensile stress in the base metal at failure. Joints brazed with the alloy of this invention have room temperature lap shear strengths that are comparable to those brazed with conventional nickel-base brazing alloys. Lap shear tests on brazed joints with brazing alloys containing 16 and 28 weight percent palladium, with chromium, silicon and boron being the same weight percent as in the 36 percent by weight palladium containing alloy, show that in the range of from about 16 to about 36 weight percent palladium, nickel and palladium are mutually interchangeable without affecting the lap shear strength.

Lap shear specimens with a 2T overlap (T=0.0625 ins.) are used for evaluating the stress rupture characteristics of the 36 weight percent palladium containing alloy. At about 1300° F. and 5000 psi the stress rupture life was over 100 hours, at which time the test is discontinued. In comparison, the 82 percent Au and the 41 percent Au containing alloys have a reported stress rupture life of about 32 hours and about 52 hours respectively, at about 1200° F. and a joint shear stress of about 5000 psi.

A T-joint brazed with the alloy of this invention is subjected to an oxidation test in air at about 1300° F. for about 200 hours. The brazed joint shows excellent resistance to oxidation with the formation of an extermely thin layer of adherent oxide comparable in thickness to the oxide layer formed on the nickel-base superalloy substrate.

Another T-joint subjected to a ductility test by bending the vertical arm through about 90° withstands failure; demonstrating the ductility of the brazing alloy and the joint.

The alloy of this invention demonstrated better wettability on a nickel-base superalloy substrate in comparison with a nickel-base brazing alloy of composition, 7.0Cr-4.5Si-2.75B-3.0Fe-Bal. Ni. The same weight of powder of each of the brazing alloys is placed on nickel-base superalloy substrates and heated to a temperature about 50° F. above liquidus temperatures of the brazing alloys. The palladium containing alloy showed a greater and more uniform area of spread and a lower contact angle.

The brazing alloy of this invention enables relatively inexpensive brazed joints for use in high temperature applications to be made at temperatures lower than those possible with conventional nickel base brazing alloys, and have better wettability, same lap shear strength as the nickel base brazing alloys, a stress rupture life better than the 82 and 41 weight percent gold containing alloys, good oxidation resistance and a joint ductility better than the 20.5 weight percent gold containing alloy.

While there has been shown and described what are at present considered the preferred embodiments of the invention, it will be obvious to those skilled in the art that various changes and modifications may be made therein without departing from the scope of the invention as defined by the appended claims.

What is claimed is:
1. A brazing alloy composition consisting essentially of from about 17 to 44 percent by weight of palladium, from about 4 to about 11 percent by weight of chromium, from about 1 to about 4 percent by weight of silicon, from about 1.5 to about 4 percent by weight of boron and the balance nickel.
2. A composition according to claim 1 wherein said alloy contains up to 4 percent by weight of iron.
3. A composition according to claim 1 containing from about 28 to 40 percent by weight of palladium.
4. A composition according to claim 1 consisting essentially of about 36 percent by weight of palladium, about 11 percent by weight of chromium, about 2.2 percent by weight of silicon, about 2.1 percent by weight of boron and about 48.7 percent by weight of nickel.
5. An alloy composition according to claim 1 wherein said alloy is in the form of a brazing sheet.
6. An alloy composition according to claim 1 wherein said alloy is in the form of a powder.